US012679475B2

(12) United States Patent
Naito et al.

(10) Patent No.: US 12,679,475 B2
(45) Date of Patent: Jul. 14, 2026

(54) JOINING BRACKET FOR SIDE SPOILER WITH REAR WINDOW

(71) Applicant: AGC Inc., Tokyo (JP)

(72) Inventors: Takuya Naito, Tokyo (JP); Ryoichi Urata, Tokyo (JP); Naohiro Yamaguchi, Tokyo (JP); Takashi Kawahara, Tokyo (JP); Satoshi Kaneko, Tokyo (JP); Hideomi Kamizono, Tokyo (JP)

(73) Assignee: AGC INC., Tokyo (JP)

( * ) Notice: Subject to any disclaimer, the term of this patent is extended or adjusted under 35 U.S.C. 154(b) by 607 days.

(21) Appl. No.: 18/135,936

(22) Filed: Apr. 18, 2023

(65) Prior Publication Data

US 2023/0331318 A1     Oct. 19, 2023

(30) Foreign Application Priority Data

Apr. 18, 2022    (JP) ................................. 2022-068234

(51) Int. Cl.
B62D 35/00 (2006.01)
(52) U.S. Cl.
CPC ................................. B62D 35/008 (2013.01)
(58) Field of Classification Search
CPC .. B60J 1/18; B60J 1/20; B62D 35/007; B62D 35/008
USPC .............................. 296/56, 146.8, 152, 180.1
See application file for complete search history.

(56) References Cited

U.S. PATENT DOCUMENTS

| | | | | |
|---|---|---|---|---|
| 5,360,253 | A * | 11/1994 | Sasaki | B62D 35/007 296/180.1 |
| 10,377,429 | B2 * | 8/2019 | Leterrier | B62D 35/007 |
| 11,667,176 | B2 * | 6/2023 | Katayama | B60J 5/107 296/56 |
| 2018/0037277 | A1 * | 2/2018 | Khayat | B62D 35/007 |
| 2021/0402752 | A1 | 12/2021 | Oonuki | |

FOREIGN PATENT DOCUMENTS

| | | |
|---|---|---|
| EP | 2 842 842 A1 | 3/2015 |
| JP | S62-196779 U | 8/1987 |
| JP | H09-039565 A | 2/1997 |
| JP | 2005-146035 A | 6/2005 |
| JP | 2015-048024 A | 3/2015 |
| JP | 2020-040472 A | 3/2020 |
| JP | 2022-007591 A | 1/2022 |

OTHER PUBLICATIONS

English translation of JP H09-039565; retrieved via Patent Translate located at www.epo.org. (Year: 2025).*

* cited by examiner

*Primary Examiner* — Jason S Daniels

(74) *Attorney, Agent, or Firm* — Foley & Lardner LLP

(57) ABSTRACT

A bracket includes a base to be bonded to a surface of a side edge portion of a glass. The side edge portion and the base are joined with a combination of at least two types of adhesives. A first adhesive has a shorter curing time than a second adhesive. The second adhesive provides stronger joining after cured than the first adhesive. In the joining, the bracket is stabilized from the outside while the side edge portion and the base are in contact with each other with the first adhesive and the second adhesive interposed therebetween. The stabilization of the bracket from the outside is released upon the first adhesive being cured. Curing the second adhesive is allowed to proceed while the bracket continues to be stabilized with the first adhesive.

16 Claims, 12 Drawing Sheets

JOINING BRACKET FOR SIDE SPOILER WITH REAR WINDOW

INCORPORATION BY REFERENCE

This application is based upon and claims the benefit of priority from Japanese patent application No. 2022-068234, filed on Apr. 18, 2022, the disclosure of which is incorporated herein in its entirety by reference.

BACKGROUND

The present disclosure relates to joining brackets for side spoilers with windows.

Japanese Unexamined Patent Application Publication No. 2015-048024 discloses mounting a side spoiler to a vehicle body. An inner member of the side spoiler is engaged with the vehicle body. Furthermore, an outer member of the side spoiler is laid over the inner member.

Japanese Unexamined Patent Application Publication No. 2020-040472 discloses mounting a side spoiler to a back door. A door-side clip is fixed to an outer panel of a vehicle body. Meanwhile, a spoiler-side clip is fixed to the side spoiler. The spoiler-side clip is fitted with the door-side clip.

Japanese Unexamined Patent Application Publication No. 2022-007591 discloses fixing an inner surface of a front windshield (paragraph [0011]) and a surface of a camera bracket (paragraph [0013]) opposing the inner surface of the front windshield to each other with two types of adhesives of different curing times. The two types of adhesives are an adhesive having a long curing time but a high bonding strength and an adhesive having a short curing time but a low bonding strength. The latter adhesive is used for so-called tentative bonding. Therefore, the latter adhesive can be replaced with a double-sided adhesive tape.

SUMMARY

The inventors have worked to join a side spoiler to a rear window using a bracket and an adhesive. The present disclosure provides a means for bonding a bracket for a side spoiler to a rear window with high accuracy. One aspect of the present disclosure is as follows.

[1] A method of manufacturing a bracket-attached glass by joining a bracket for a side spoiler to a rear window glass of a vehicle, wherein
the rear window glass includes a side edge portion to which the bracket is to be attached,
the bracket includes a base to be bonded to a surface of the side edge portion, the surface facing at least either an outer side or an inner side of the vehicle,
the side edge portion and the base are joined to each other with use of a combination of at least two types of adhesives including a first adhesive and a second adhesive, the first adhesive having a shorter curing time than the second adhesive, the second adhesive providing stronger joining after cured than the first adhesive, and
in the joining,
   the bracket is stabilized from an outside in a state in which the side edge portion and the base are in contact with each other with the first adhesive and the second adhesive interposed therebetween, and
   the stabilization of the bracket from the outside is released upon the first adhesive being cured, and curing of the second adhesive is allowed to proceed while the bracket continues to be stabilized with the first adhesive.

[2] The method according to [1], wherein
the bracket further includes a securing portion for securing a side spoiler,
when the bracket is stabilized from the outside, the bracket is positioned such that the securing portion has a predetermined orientation with the rear window glass serving as a reference, and at this point, an inclination is permitted to arise between the side edge portion and the base, and
the first adhesive and the second adhesive are cured while a gap between the side edge portion and the base is filled with the second adhesive and the first adhesive.

[3] The method according to [2], wherein
the bracket includes a portion that extends in a lengthwise direction along the side edge portion,
a first bonding area on the base to which the first adhesive is to be applied is provided at at least two positions along the lengthwise direction of the bracket, and opposes at least two positions located in a top-and-bottom direction on the side edge portion, and
the predetermined orientation of the securing portion is an orientation of the securing portion whose axis of rotation extends in the lengthwise direction.

[4] The method according to [3], wherein
the first bonding areas are permitted to have a twisted orientation with respect to each other whose axis of rotation extends in the lengthwise direction, and
the first adhesive is cured while a variation in a size of an inclination between the side edge portion and each first bonding area produced due to the twisted orientation is compensated for by a thickness of the first adhesive.

[5] The method according to [1], wherein
the bracket further incudes a securing portion for securing the side spoiler, and
the bracket is secured in a state in which the base is in contact with the inner surface of the rear window glass in the side edge portion and in which the securing portion lies outside a side edge of the rear window glass.

[6] The method according to [5], wherein the outer surface of the rear window glass in the side edge portion and a portion of the bracket that lies outside the side edge of the rear window glass are further linked with a reinforcer.

[7] The method according to [6], wherein
a combination of at least two types of adhesives including a third adhesive and a fourth adhesive is used to join the side edge portion and the reinforcer,
the third adhesive has a shorter curing time than the fourth adhesive, and the fourth adhesive provides stronger joining after cured than the third adhesive,
the third adhesive has a composition identical to or different from a composition of the first adhesive, and
the fourth adhesive has a composition identical to or different from a composition of the second adhesive.

[8] The method according to [1], wherein
the first adhesive is a hot-melt adhesive,
the second adhesive is an adhesive of at least one or more types selected from a moisture curing-type adhesive, a heat curing-type adhesive, a mixing reaction-type adhesive, a light curing-type adhesive, and an anaerobic curing-type adhesive, and
when the combination of adhesives is placed between the side edge portion and the base, the second adhesive is applied first to either the side edge portion or the base, and then the first adhesive thermally molten in advance is applied to either the side edge portion or the base.

[9] A bracket-attached glass in which a bracket for a side spoiler is joined to a rear window glass of a vehicle, wherein the rear window glass includes a side edge portion to which the bracket is to be attached, the bracket includes a base to be bonded to a surface of the side edge portion, the surface facing at least either an outer side or an inner side of the vehicle, the side edge portion and the base are joined to each other with use of a combination of at least two types of adhesives including a first adhesive and a second adhesive, and the first adhesive has a shorter curing time than the second adhesive, and the second adhesive provides stronger joining after cured than the first adhesive.

[10] The bracket-attached glass according to [9], wherein the bracket includes a portion that extends in a lengthwise direction along the side edge portion, and a first bonding area on the base to which the first adhesive is to be applied is provided at at least two positions along the lengthwise direction of the bracket, and opposes at least two positions located in a top-and-bottom direction on the side edge portion.

[11] The bracket-attached glass according to [10], wherein the first bonding areas are permitted to have a twisted orientation with respect to each other whose axis of rotation extends in the lengthwise direction, and a variation in an inclination between the side edge portion and each first bonding area produced due to the twisted orientation is compensated for by the first adhesive.

[12] The bracket-attached glass according to [9], wherein the rear window glass includes a joining portion where the rear window glass is joined with a window frame of the vehicle, and further includes the side edge portion to a side of the joining portion, the bracket further incudes a securing portion for securing the side spoiler, and the base is in contact with the inner surface of the rear window glass in the side edge portion, and the securing portion lies outside the side edge portion of the rear window glass.

[13] The bracket-attached glass according to [12], further comprising a reinforcer configured to link the outer surface of the rear window glass in the side edge portion with a portion of the bracket that lies outside the side edge portion of the rear window glass.

[14] A tailgate provided with a side spoiler, the tailgate further comprising a window frame joined to the bracket-attached glass according to [9], wherein the side spoiler is joined to the bracket.

[15] A vehicle provided with a side spoiler, the vehicle further comprising a window frame joined to the bracket-attached glass according to [9], wherein the side spoiler is joined to the bracket.

The present disclosure provides a means for bonding a bracket for a side spoiler to a rear window with high accuracy.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

<Bracket-Attached Glass>

Figure 1:
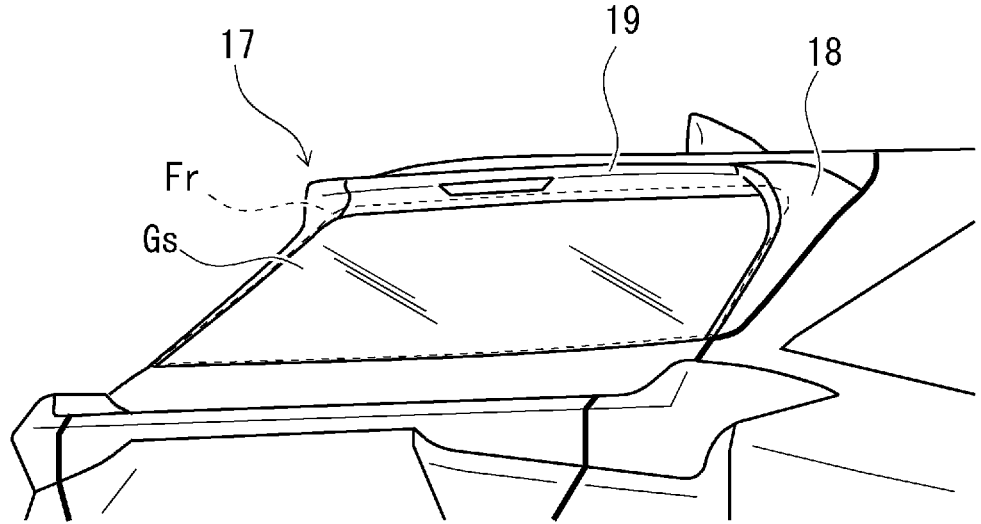
FIG. 1 is a perspective view of the rear of a vehicle.

FIG. 1 shows the rear of a vehicle. The vehicle includes a tailgate 17. The tailgate 17 includes a side spoiler 18, a glass Gs, and a window frame Fr.

The side spoiler 18, which is also called a side fin, is an aerodynamic exterior component. The side spoiler 18 is shaped like a caudal fin of a fish or a rudder of a ship and extends from a rear end on each side of the vehicle toward the behind of the vehicle. The side spoiler 18 is separate from a rear spoiler 19 provided at an upper portion of the tailgate 17. However, one embodiment shown in the drawing has an integrated design in which these components form a continuous surface. In another embodiment different from the embodiment shown in the drawing, the side spoiler 18 and the rear spoiler 19 are an integrated component.

The glass Gs shown in FIG. 1 is a rear window glass. The window frame Fr is joined to the glass Gs. The side spoiler 18 is mounted to the glass Gs with a bracket interposed therebetween.

The bracket is concealed by the side spoiler 18. The vehicle does not need to include the tailgate 17. The glass Gs may be mounted directly to a window frame formed in the body of the vehicle.

Figure 2:
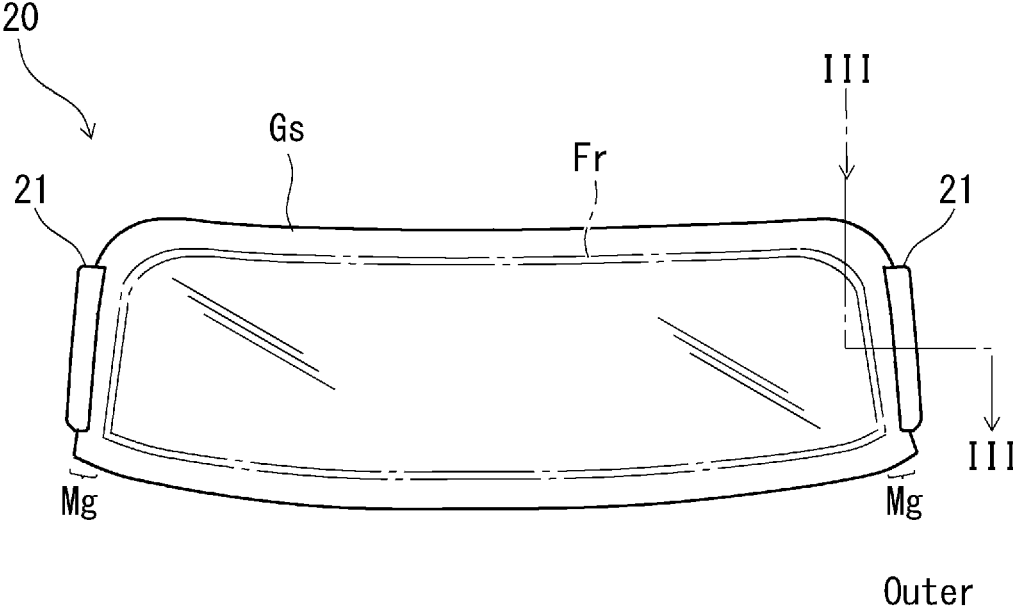
FIG. 2 is a front view of a bracket-attached glass.

FIG. 2 shows a bracket-attached glass 20 viewed from the front. In the present embodiment, the term "front" refers to the direction that becomes the rear of a vehicle when a bracket-attached glass is mounted to the vehicle as shown in FIG. 1. The bracket-attached glass 20 is manufactured by joining a bracket 21 to the glass Gs. The bracket-attached glass 20 is joined to the window frame Fr of the vehicle.

The glass Gs shown in FIG. 2 is composed preferably of any of a soda-lime glass, a borosilicate glass, a non-alkali glass, or a silica glass, and a soda-lime glass is particularly preferable. In one embodiment, the glass Gs is a glass plate obtained by molding molten glass through a floating technique.

The glass Gs shown in FIG. 2 may be a single sheet of tempered glass. A tempered glass has a compressive stress layer on its surface and has a tensile stress layer in its inside. The glass Gs may be either a physical tempered glass or a chemical tempered glass. An example of a physical tempered glass is an air-quench tempered glass. An air-quench tempered glass is fabricated by rapidly cooling only the surface of a uniformly heated glass plate to lower the temperature of the surface to below a temperature near its softening point. The difference between the temperature of the surface and the temperature of the inside of the glass plate produces a compressive stress layer on the surface and a tensile stress layer inside the glass plate. Functions of these layers make the surface of the glass less susceptible to breaking. A chemical tempered glass is fabricated, for example, through an ion exchange technique.

In one embodiment shown in FIG. 2, the glass Gs may be colored to such an extent that the transparency required of a rear window glass can be ensured. The glass Gs is thick enough to satisfy the strength and the weight required of a rear window glass. The thickness is preferably 0.5 mm or more and 5.0 mm or less. The thickness is more preferably 1.5-3.5 mm.

The glass Gs shown in FIG. 2 may be a laminated glass. A laminated glass is composed of a plurality of glass plates and an intermediate film joining the glass plates. These glass plates may have the same thickness or different thicknesses.

A laminated glass includes an outer layer glass to be located in the outer surface of the vehicle when the laminated glass is mounted to the vehicle and an inner layer glass to be located in the inner surface of the vehicle. In the present embodiment, the term "outer" refers to the direction that faces the outside of a vehicle when a bracket-attached glass is mounted to the vehicle. The term "inner" refers to the direction that faces the inside of a vehicle when a bracket-attached glass is mounted to the vehicle.

The outer layer glass has a strength to withstand a hit by a flying stone. The outer layer glass has a thickness of preferably 1.1 mm or more or more preferably 1.8 mm or more. It is preferable to keep the laminated glass as a whole lightweight by keeping the thickness of the outer layer glass to 3.0 mm or less or preferably to 2.8 mm or less.

Meanwhile, it is preferable to make the inner layer glass easy to handle by keeping the thickness of the inner layer glass to 0.3 mm or more. It is preferable to keep the laminated glass as a whole lightweight by keeping the thickness of the inner layer glass to 2.3 mm or less.

In one embodiment, a material for an intermediate film in a laminated glass is a resin composition. A resin composition preferably contains a thermoplastic resin. Examples of thermoplastic resins include a plasticized polyvinyl acetal-based resin, a plasticized polyvinyl chloride-based resin, a saturated polyester-based resin, a plasticized saturated polyester-based resin, a polyurethane-based resin, a plasticized polyurethane-based resin, an ethylene-vinyl acetate copolymer-based resin, an ethylene-ethyl acrylate copolymer-based resin, a cyclo-olefin polymer resin, and an ionomer resin. Furthermore, a resin composition containing a modified block copolymer hydride described in Japanese Unexamined Patent Application Publication No. 2020-040472 can also be used suitably.

An intermediate film is preferably a resin composition containing a polyvinyl acetal-based resin. A polyvinyl acetal-based resin is preferably plasticized with a plasticizer having added thereto. Such a resin composition excels in transparency, weatherability, strength, bonding strength, anti-penetrability, impact-energy absorptivity, moisture resistance, heat-blocking property, or sound-insulating property. Examples of polyvinyl acetal-based resins include a polyvinyl formal resin obtained by reacting polyvinyl alcohol (PVA) with formaldehyde, a narrow-sense polyvinyl acetal-based resin obtained by reacting PVA with acetaldehyde, and a polyvinyl butyral resin (PVB) obtained by reacting PVA with n-butyraldehyde. PVB can provide a good balance of transparency, weatherability, strength, bonding strength, anti-penetrability, impact-energy absorptivity, moisture resistance, heat-blocking property, and sound-insulating property required of a rear window glass.

These polyvinyl acetal-based resins may be used singly, or two or more of these polyvinyl acetal-based resins may be used in combination.

The glass Gs shown in FIG. 2 may be curved so as to be convex on the outer side. In one embodiment, a glass plate is obtained by flatly molding molten glass through a floating technique, and then the glass plate is curved through gravity forming or press forming. This bending is performed after the glass is softened through heating. The temperature of heating the glass when the bending is performed is about 550° C. or higher and 700° C. or lower.

In a case in which the glass Gs shown in FIG. 2 is a laminated glass, the bending is performed on the outer layer glass, the inner layer glass, and other glass plates. The curved glass plates are joined to each other with an intermediate film. The radius of curvature of the glass plates is preferably $1 \times 10^3$-$1 \times 10^5$ mm In one embodiment shown in FIG. 2, the glass Gs has a mono-directionally curved shape obtained by bending the glass Gs only in one direction of the top-and-bottom direction or the right-and-left direction. In another embodiment, the glass Gs has a multi-directionally curved shape obtained by bending the glass Gs in the top-and-bottom direction and in the right-and-left direction. In a case in which the glass Gs is a laminated glass, the outer layer glass and the inner layer glass may have the same radius of curvature or different radii of curvature.

As shown in FIG. 2, a bracket 21 is joined to each of the right and left side edges of the glass Gs. Each bracket 21 is attached at a position closer to the edge of the glass Gs than the position where the window frame Fr is joined to the glass Gs. In the present embodiment, the portion of the glass Gs that is located to the side of the window frame Fr toward the edge is referred to as a side edge portion Mg. The side edge portion Mg functions as a margin for bonding the brackets 21 to the glass Gs.

<Bonding of Bracket and Glass>

Figure 3:
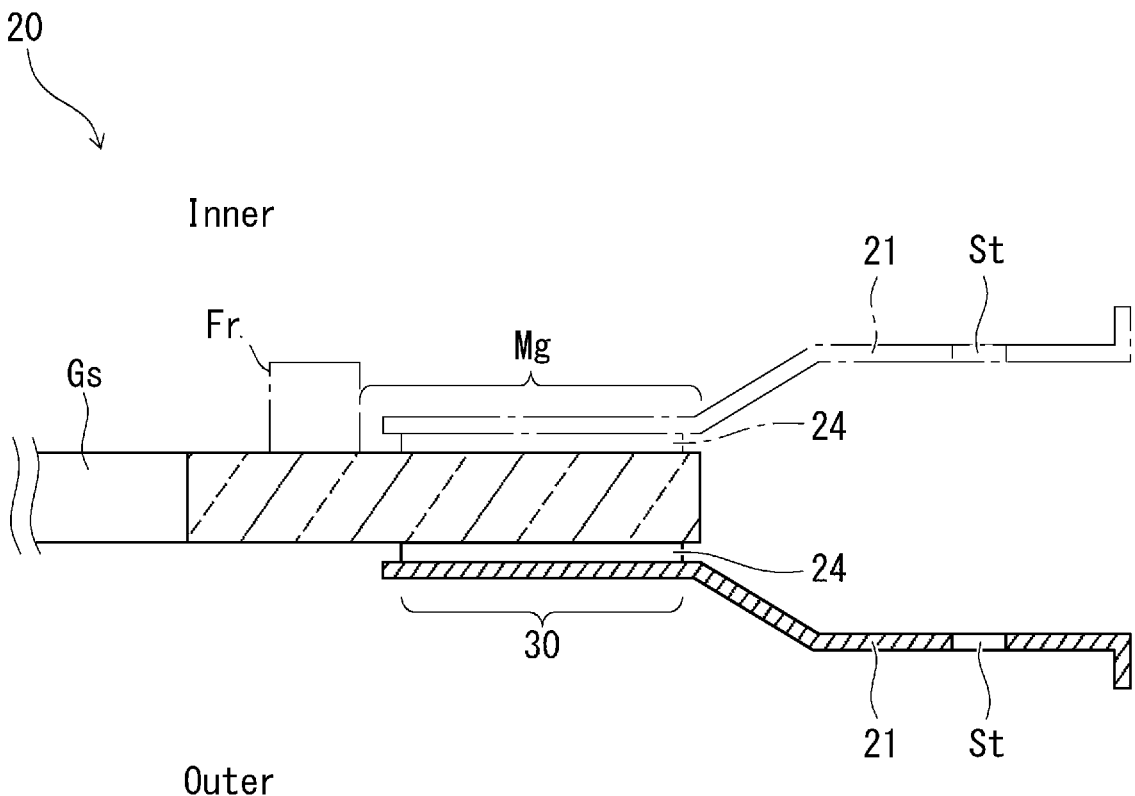
FIG. 3 is a half sectional view of a bracket-attached glass.

FIG. 3 shows a bracket-attached glass 20 cut along the line indicated in FIG. 2. The bracket 21 includes a base 30 to be bonded to a surface of the side edge portion Mg. In one embodiment, the base 30 is bonded to an outer surface of the side edge portion Mg with an adhesive 24. In another embodiment, the base 30 is bonded to an inner surface of the side edge portion Mg with an adhesive 24. The base 30 serves as a root portion of the bracket 21.

As shown in FIG. 3, the bracket 21 further includes a securing portion St for securing a side spoiler. In one embodiment shown in the drawing, the securing portion St is a through-hole provided in the bracket 21. In one embodiment shown in the drawing, the hole of the securing portion St penetrates the bracket 21 from the inner side to the outer side of the vehicle. In one embodiment, the securing portion St lies outside the side edge of the glass Gs.

<Use of Adhesives>

Figure 4:
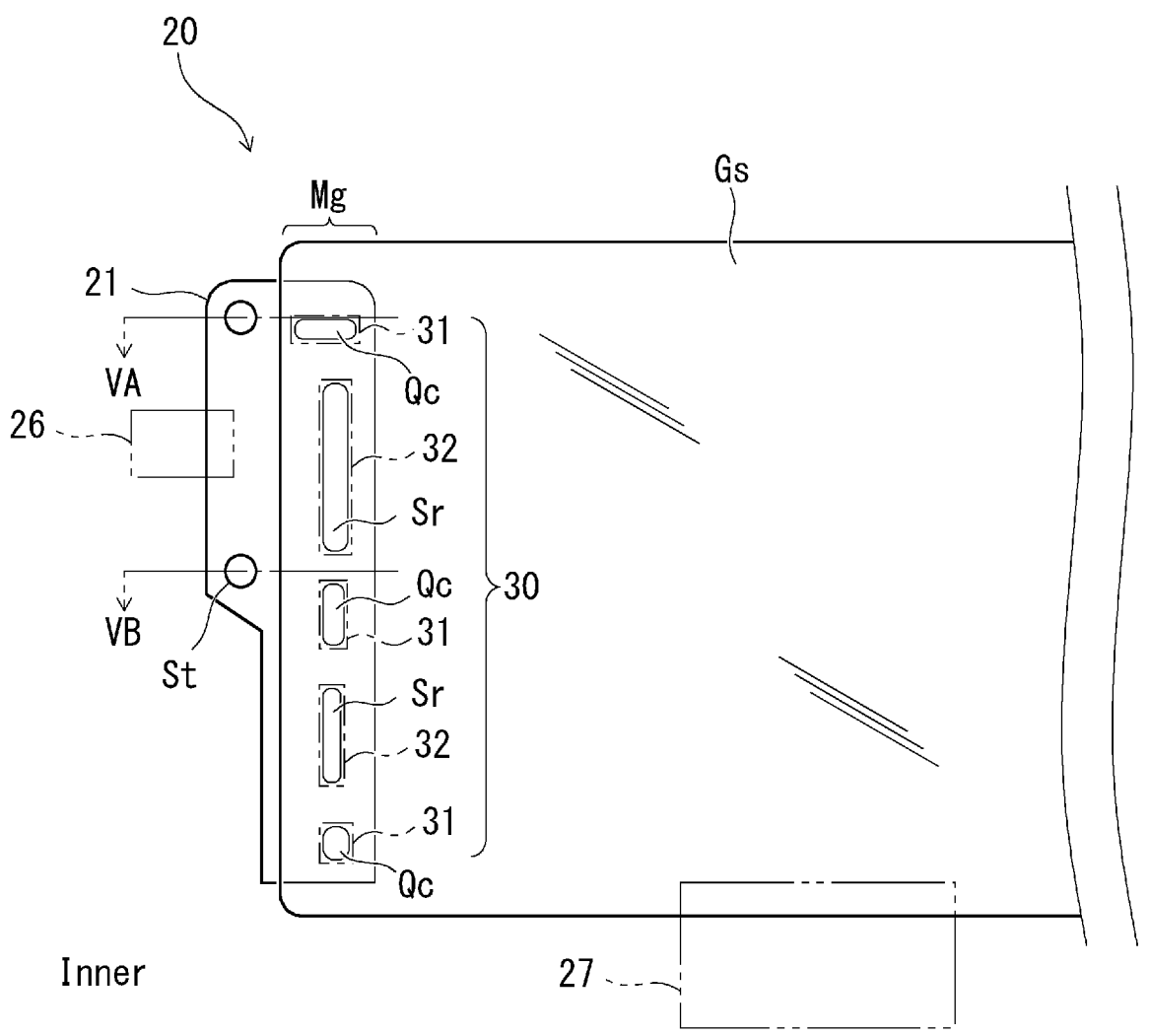
FIG. 4 is a rear view of a bracket.

FIG. 4 shows a bracket-attached glass 20 viewed from the back. In the drawing, the bracket 21 is viewed from the back through the glass Gs. The bracket 21 includes a portion that extends in the lengthwise direction along the side edge portion Mg. In the base 30, first bonding areas 31 and second bonding areas 32 lie alongside each other in the lengthwise direction of the bracket 21.

In the present embodiment, at least two types of adhesives are used in combination as the adhesive 24 shown in FIG. 3. As shown in FIG. 4, a first adhesive Qc of a quick curing type and a second adhesive Sr of a strong type are used to join the side edge portion Mg and the base 30.

The first adhesive Qc shown in FIG. 4 has a shorter curing time than the second adhesive Sr. While the first adhesive Qc is solid at room temperature of, for example, 23±2° C., the first adhesive Qc melts upon being heated. As the first adhesive Qc molten and thus liquefied returns into a solid upon being cooled, the first adhesive Qc bonds objects to be bonded to each other. The first adhesive Qc may be cooled through heat dissipation at room temperature, may be cooled gradually at a temperature higher than room temperature, or may be cooled rapidly at a temperature lower than room temperature. Examples of the first adhesive Qc include a hot-melt adhesive including one or more of an ethylene vinyl acetate copolymer-based adhesive, a polyamide-base adhesive, a synthetic rubber-based adhesive, an acryl-based adhesive, a polyurethane-based adhesive, a polyolefin-based adhesive, a polyester-based adhesive, or a silicone-based adhesive. The second adhesive Sr provides stronger joining after cured than the first adhesive Qc. The second adhesive Sr is liquid at normal temperature. The second adhesive Sr undergoes self-curing reaction in its ordinary usage mode— for example, while being left in the standard atmosphere below. Examples of the second adhesive Sr include an adhesive including one or more of an epoxy-based adhesive, a urethane-base adhesive, a silicone-base adhesive, a modi-fied silicone-based adhesive, a melamine-based adhesive, a phenol-based adhesive, or an acryl-base adhesive. The sec-ond adhesive Sr is classified as an adhesive of at least any of, for example, a moisture curing-type adhesive, a heat curing-type adhesive, a mixing reaction-type adhesive, a light curing-type adhesive, or an anaerobic curing-type adhesive.

The curing time and the strength of joining after curing may be measured in a standard atmosphere. The standard atmosphere is a temperature of 23±2° C. and a relative humidity of (50±10)%, as defined by JIS K 6833-1 and JIS K 7100 cited by JIS K 6833-1. Other types of adhesives may further be used for joining. These adhesives may be those that start being cured upon two or more of the adhesives having been mixed.

As shown in FIG. 4, the first adhesive Qc is applied to the first bonding areas 31. The second adhesive Sr is applied to the second bonding areas 32. In one embodiment, a first bonding area 31 and a second bonding area 32 form a set. The second bonding areas 32 are broader than the first bonding areas 31.

In one embodiment shown in FIG. 4, the first adhesive Qc and the second adhesive Sr are placed between the glass Gs and the bracket 21. The first adhesive Qc is applied, in advance, to the surface of the first bonding areas 31. In another embodiment, the first adhesive Qc is applied, in advance, to the portions of the side edge portion Mg that oppose the first bonding areas 31.

In one embodiment shown in FIG. 4, the second adhesive Sr is applied, in advance, to the second bonding areas 32. In another embodiment, the second adhesive Sr is applied, in advance, to the portions of the side edge portion Mg that oppose the second bonding areas 32. A primer may be applied, in advance, to at least either of the second bonding areas 32 or the portions of the side edge portion Mg that oppose the second bonding areas 32, and thus the bonding by the second adhesive Sr may be further strengthened.

In one embodiment shown in FIG. 4, at least two first bonding areas 31 are provided along the lengthwise direc-tion of the bracket 21. These first bonding areas 31 oppose at least two positions located alongside each other in the top-and-bottom direction on the side edge portion Mg. In one embodiment, at least two second bonding areas 32 are provided along the lengthwise direction of the bracket 21. These second bonding areas 32 oppose at least two positions located alongside each other in the top-and-bottom direction on the side edge portion Mg.

As shown in FIG. 4, the side edge portion Mg and the base 30 are in contact with each other with a combination of adhesives including the first adhesive Qc and the second adhesive Sr interposed therebetween. At this point, the attitude of the bracket 21 is stabilized from the outside of the glass Gs. For example, the attitude of the bracket 21 is stabilized by a jig 26. Furthermore, the attitude of the glass Gs is stabilized by a jig 27.

As shown in FIG. 4, the bracket 21 is made stationary relative to the glass Gs. Curing of the first adhesive Qc and the second adhesive Sr is allowed to proceed while the bracket 21 and the glass Gs are secured. When the first adhesive Qc has been cured, the stabilization of the attitude from the outside is released. While the bracket 21 and the glass Gs continue to be secured with the first adhesive Qc, curing of the second adhesive Sr is allowed to proceed.

In one embodiment shown in FIG. 4, the first adhesive Qc is a hot-melt adhesive. In this case, the second adhesive Sr is applied to the second bonding areas 32 first, and then the first adhesive Qc thermally molten in advance is applied to the first bonding areas 31. The first adhesive Qc is cured promptly by dissipating heat to its surroundings. Therefore, it is preferable that, after the first adhesive Qc is applied, the attitudes of the bracket 21 and the glass Gs be stabilized promptly and the bracket 21 and the glass Gs be coupled promptly.

<Filling Gap with Adhesive and Orientation of Securing Portion>

Figure 5A:
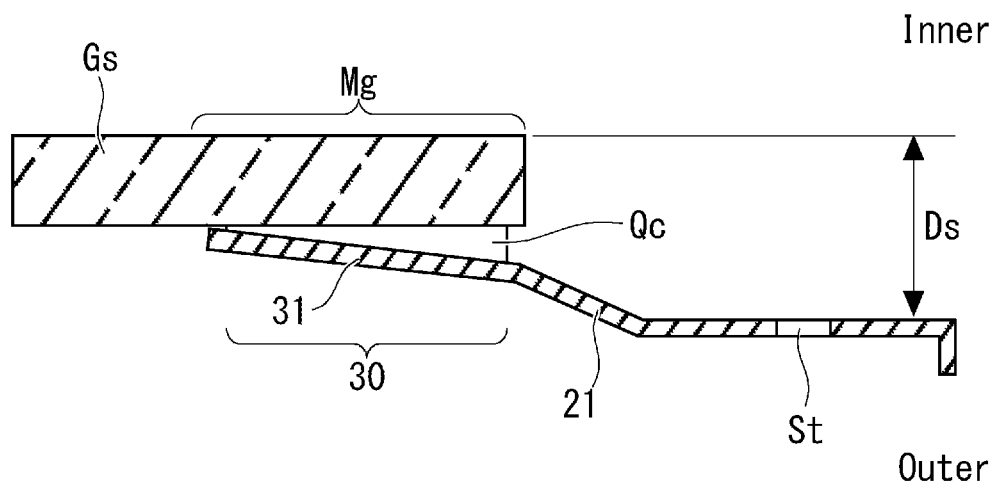
FIGS. 5A and 5B are each a sectional view of joining between a bracket and a glass.

FIG. 5A is a sectional view along the cut line VA-VA indicated in FIG. 4 and shows the joining of the bracket 21 and the glass Gs.

Figure 5B:
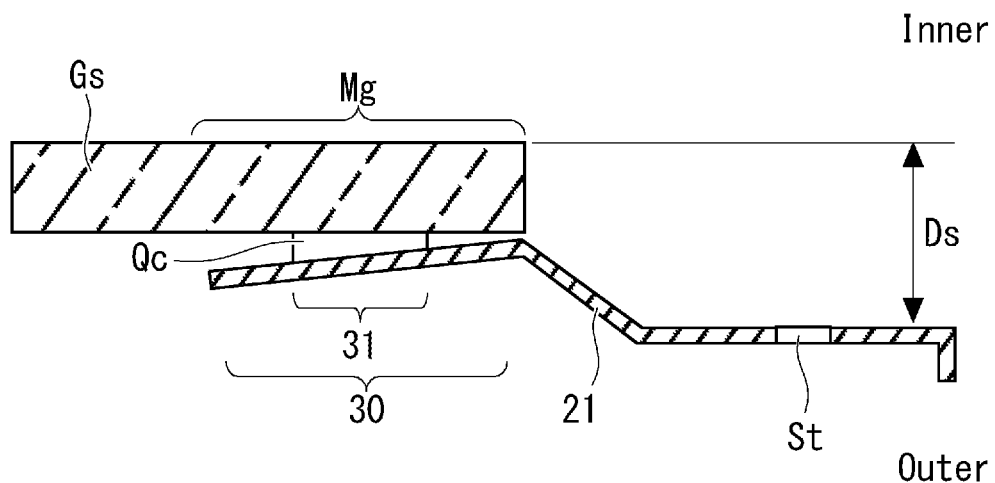

FIG. 5B is a sectional view along the cut line VB-VB indicated in FIG. 4 and shows the joining of the bracket 21 and the glass Gs. As shown in FIG. 4, the bracket 21 is positioned when the bracket 21 is stabilized from the out-side.

As shown in FIGS. 5A and 5B, this positioning puts the securing portion St in a predetermined orientation with the glass Gs serving as a reference. In one embodiment, the predetermined orientation of the securing portion St is an orientation of the securing portion St whose axis of rotation extends in the lengthwise direction of the bracket 21. In one example in which the securing portion St is a through-hole, the through-hole extends perpendicular to the surface of the glass Gs.

As shown in FIGS. 5A and 5B, when the securing portion St is put in a predetermined orientation, a design length Ds may be set to, for example, the distance between an end portion of the bracket 21 and the inner surface of the glass Gs. A tolerance may be set to the design length Ds. The method of the present embodiment can bond the bracket 21 and the glass Gs with high accuracy, and thus this tolerance can be reduced.

As shown in FIGS. 5A and 5B, the shape of the bracket 21 varies, and thus the orientation of the securing portion St may fail to be in a predetermined orientation when the surface of the side edge portion Mg and the surface of the base 30 are brought into tight contact. Therefore, the pres-ence of an inclination is permitted between the side edge portion Mg and the base 30 when the bracket 21 is posi-tioned. This inclination produces a gap between the side edge portion Mg and the base 30. Thus, the first adhesive Qc is cured while the gap between the side edge portion Mg and the base 30 is filled with the first adhesive Qc. Furthermore, the second adhesive Sr is cured while the gap between the side edge portion Mg and the base 30 is filled with the second adhesive Sr shown in FIG. 4.

As shown in FIGS. 5A and 5B, the shape of the bracket 21 varies, and thus the first bonding areas 31 may be permitted to have a twisted orientation with respect to each other with their axes of rotation extending in the lengthwise direction of the bracket 21. The first adhesive Qc is cured while the variation in the size of the gap between the side edge portion Mg and the first bonding areas 31 produced due to the twisted orientation is compensated for by the thickness of the first adhesive Qc. The second adhesive Sr shown in FIG. 4 is also cured slowly while the variation in the size of the gap between the side edge portion Mg and the first bonding areas 31 is compensated for. Since such compensation is made, the bracket 21 and the glass Gs can be bonded with high accuracy without being affected by the variation in the shape of the bracket 21.

Example 1: Bracket Provided on Outer Side of Rear Window Glass

Figure 6:
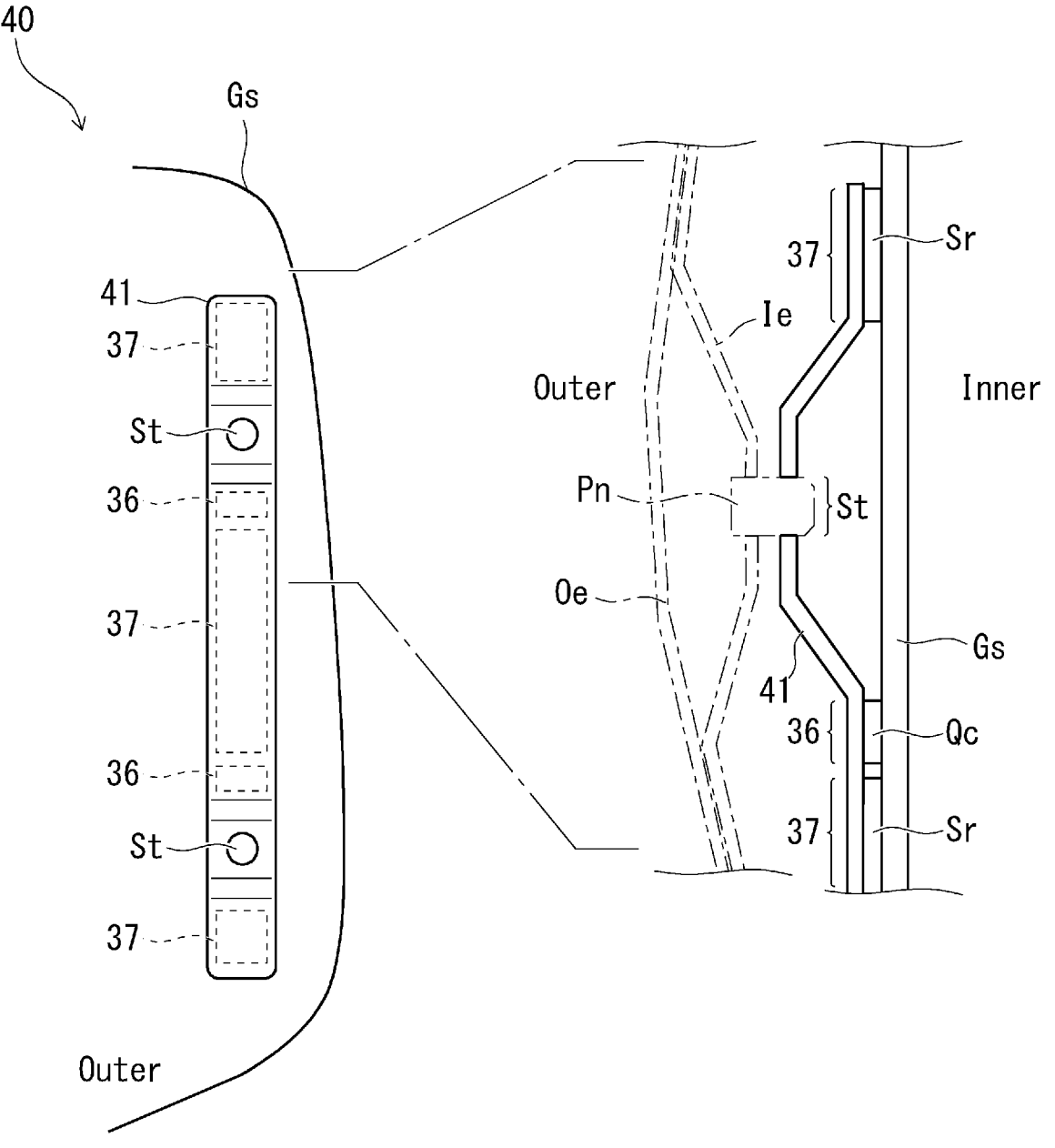
FIG. 6 shows a front view and a fragmentary left side view of a bracket-attached glass.

The left section of FIG. 6 shows a bracket-attached glass 40 viewed from the front. The right section shows, in enlargement, a part of the bracket-attached glass 40 viewed from the left side. A bracket 41 is joined to the outer side of a glass Gs. First, a first adhesive Qc applied to first bonding areas 36 is cured, and thus the bracket 41 is secured to the glass Gs. Next, a second adhesive Sr applied to second bonding areas 37 is cured, and thus the bracket 41 is coupled strongly to the glass Gs.

A side spoiler is mounted to bracket-attached glass 40 shown in FIG. 6. The side spoiler is composed of an inner member Ie and an outer member Oe. The outer member Oe has an aerodynamic design of a side spoiler. First, the inner member Ie is joined to a securing portion St. The securing portion St is located above the glass Gs. In one embodiment, the inner member Ie and the securing portion St each have a through-hole. A pin Pn passes through these through-holes, and thus the inner member Ie and the securing portion St are joined together. The outer member Oe lies over the inner member Ie.

Example 2: Bracket Provided on Inner Side of Rear Window Glass

Figure 7:
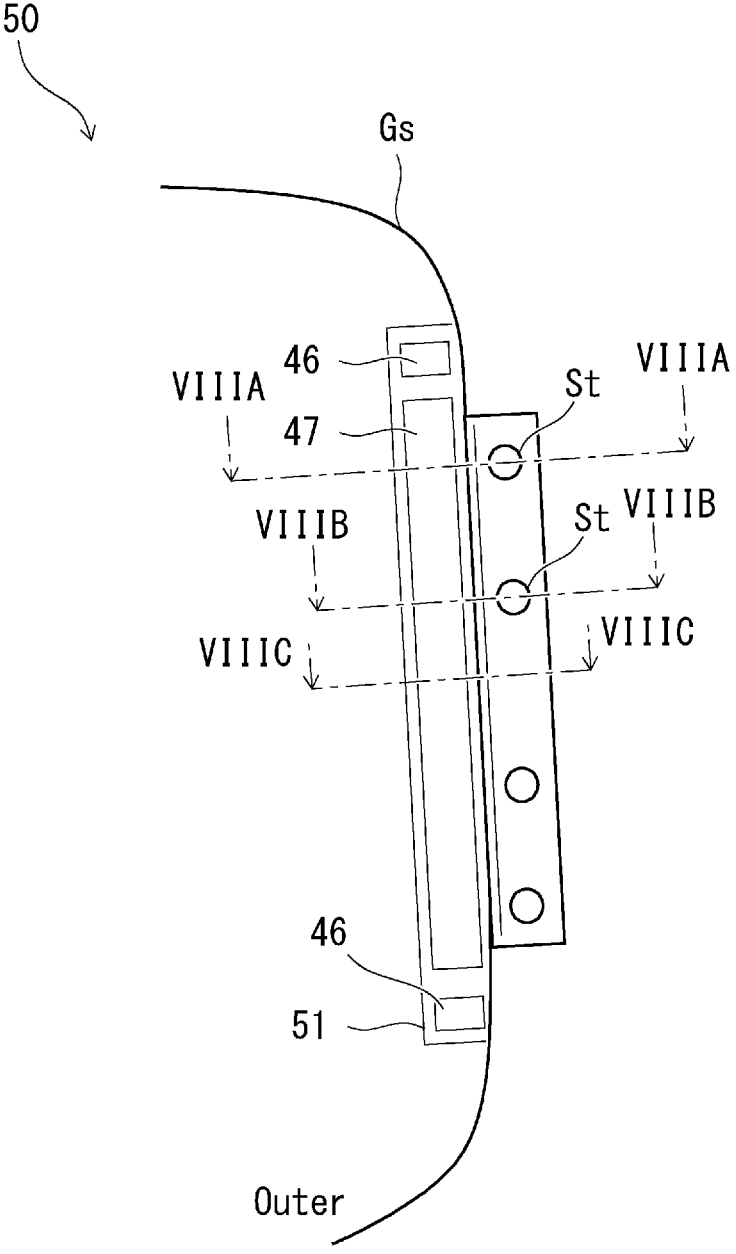
FIG. 7 is a front view of a bracket-attached glass.
Figure 8A:
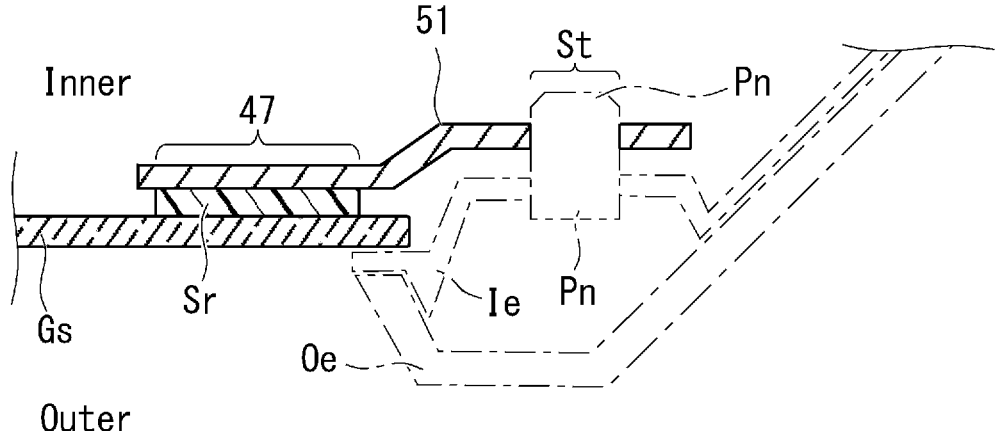
FIGS. 8A to 8C are each a sectional view of a bracket-attached glass.
Figure 8B:
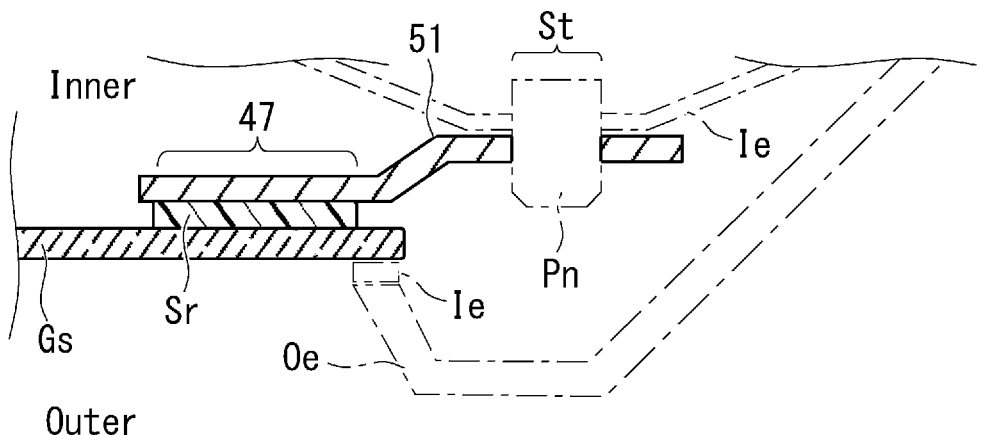
Figure 8C:
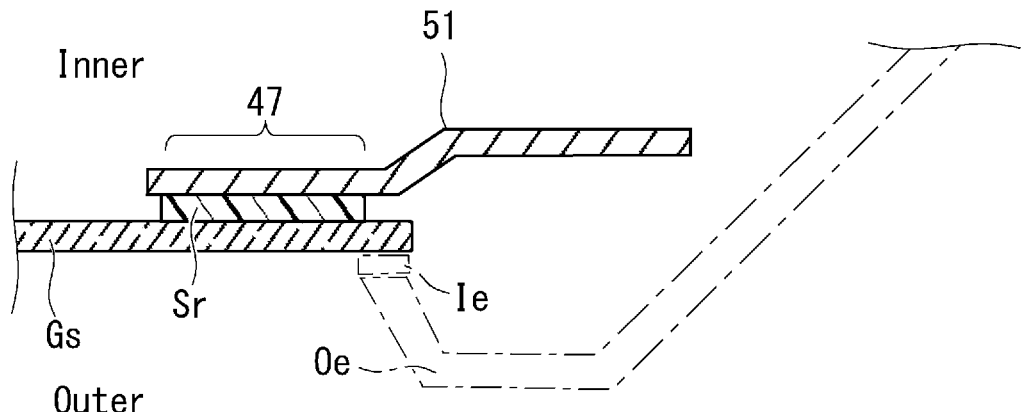

FIG. 7 shows a bracket-attached glass 50 viewed from the front. FIGS. 8A to 8C show the bracket-attached glass 50 viewed along, respectively, a section taken along the uppermost VIIIA-VIIIA line indicated in FIG. 7, a section taken along the VIIIB-VIIIB line closer to the upper side, and a section taken along the VIIIC-VIIIC line in the center. As shown in FIG. 7, a bracket 51 is joined to the inner side of a glass Gs. First, a first adhesive of a quick curing type applied to first bonding areas 46 is cured, and thus the bracket 51 is secured to the glass Gs. Next, as shown in FIGS. 8A to 8C, a second adhesive Sr of a strong type applied to a second bonding area 47 is cured, and thus the bracket 51 is coupled strongly to the glass Gs.

A side spoiler is mounted to the bracket-attached glass 50 shown in FIGS. 8A to 8C. First, in the VIIIA-VIIIA section and the VIIIB-VIIIB section, an inner member Ie is joined to each securing portion St. The securing portions St are located outside the side edge of the glass Gs. In the VIIIA-VIIIA section, a pin Pn passes through a through-hole in the inner member Ie and a through-hole of the securing portion St from the outer side. Furthermore, in the VIIIB-VIIIB section, another pin Pn passes through a through-hole in the inner member Ie and a through-hole of the securing portion St from the inner side. In the VIIIC-VIIIC section, there is no joining of the inner member Ie and the securing portions St. An outer member Oe lies over the inner member Ie secured to the bracket 51.

Example 3: Reinforcement of Bracket with Reinforcer

Figure 9:
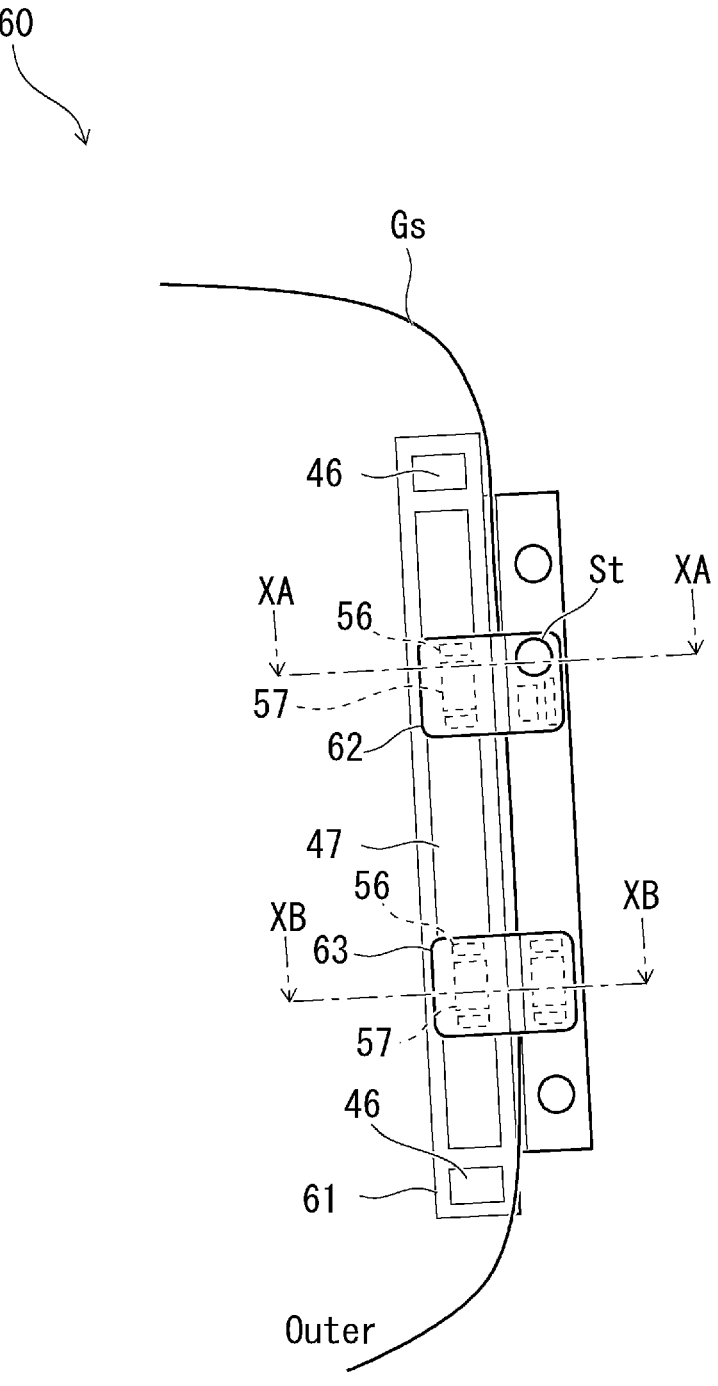
FIG. 9 is a front view of a bracket-attached glass.
Figure 10A:
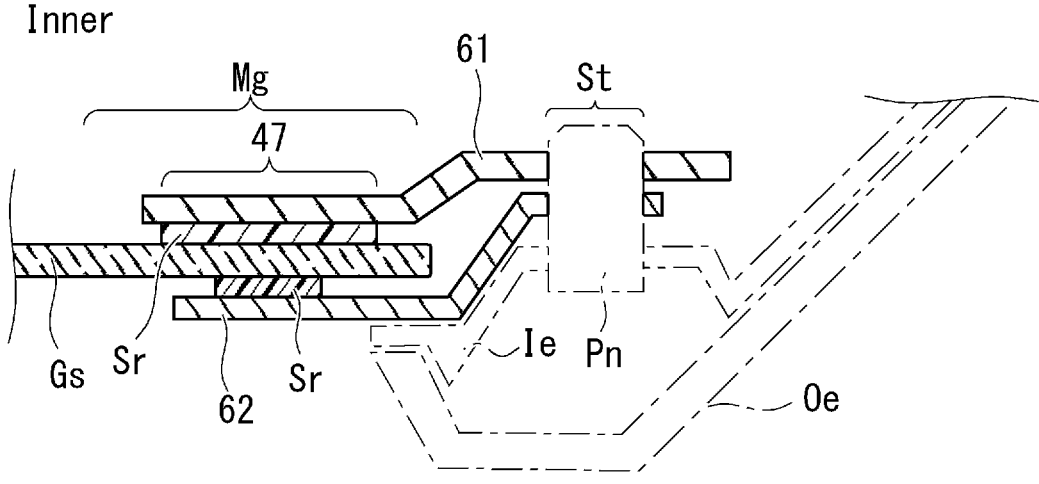
FIGS. 10A and 10B are each a sectional view of a bracket-attached glass.
Figure 10B:
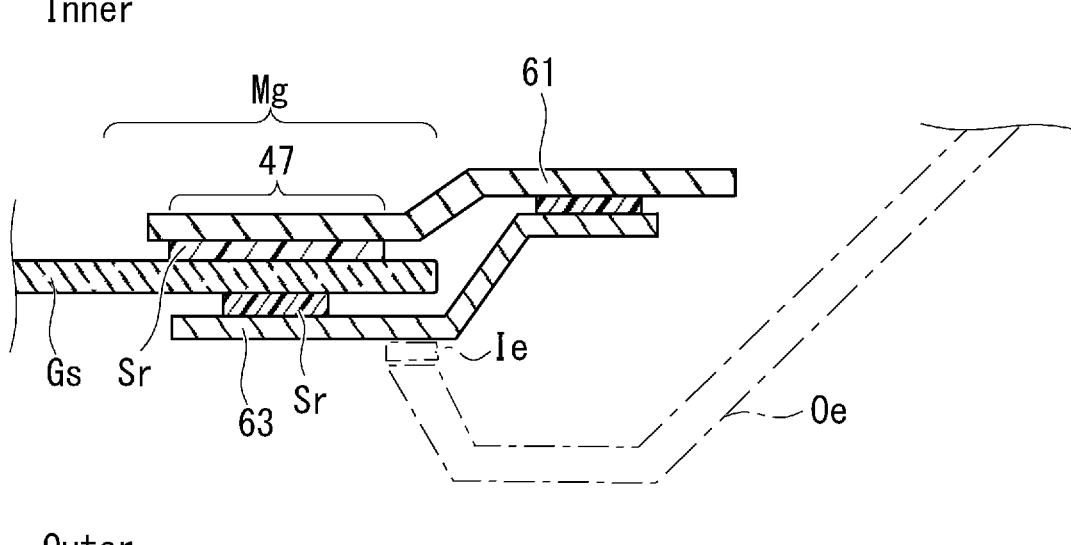

FIG. 9 shows a bracket-attached glass 60 viewed from the front. FIGS. 10A and 10B show the bracket-attached glass 60 viewed along, respectively, a section taken along the XA-XA line indicated in the upper side of FIG. 9 and a section taken along the XB-XB line indicated in the lower side.

A bracket 61 is joined to the inner side of a glass Gs. First, a first adhesive of a quick curing type applied to first bonding areas 46 is cured, and thus the bracket 61 is secured to the glass Gs. Next, a second adhesive Sr of a strong type applied to a second bonding area 47 is cured, and thus the bracket 61 is coupled strongly to the glass Gs.

As shown in FIGS. 10A and 10B, the outer surface of the glass Gs in the side edge portion Mg and the portion of the bracket 61 that extends outside the side edge of the glass Gs are further coupled with a reinforcer 62 and a reinforcer 63. The reinforcer 62 shown along the XA-XA section includes a securing portion St for securing a side spoiler. The reinforcer 63 shown along the XB-XB section does not include any securing portion for securing a side spoiler.

As shown in FIG. 9, the reinforcer 62 and the reinforcer 63 are joined to the outer side of the glass Gs. First, a third adhesive of a quick curing type applied to third bonding areas 56 is cured, and thus these reinforcers are secured to the glass Gs. The third adhesive has a composition identical to or different from the composition of a first adhesive.

Next, as shown in FIGS. 10A and 10B, a fourth adhesive of a strong type applied to fourth bonding areas 57 is cured, and thus these reinforcers are coupled strongly to the glass Gs. The fourth adhesive has a composition identical to or different from the composition of a second adhesive. Furthermore, as shown in FIGS. 10A and 10B, the reinforcer 63 is joined to the outer side of the bracket 61. There is no particular limitation on the manner in which this joining is achieved.

The third adhesive has a shorter curing time than the fourth adhesive, and the fourth adhesive provides stronger joining after cured than the third adhesive.

A side spoiler is mounted to the bracket-attached glass 60 shown in FIGS. 10A and 10B. First, in the XA-XA section, an inner member Ie is joined to the securing portions St of the bracket 61 and of the reinforcer 62. The securing portions St are located outside the side edge of the glass Gs. In the XA-XA section, a pin Pn passes through a through-hole in the inner member Ie and through-holes of the securing portions St of the bracket 61 and of the reinforcer 62 from the outer side. The pin Pn joins the bracket 61, the reinforcer 62, and the inner member Ie In the XB-XB section, there is no joining of the inner member Ie and the securing portions St. An outer member Oe lies over the inner member Ie secured to the bracket 61.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of manufacturing a bracket-attached glass by joining a bracket for a side spoiler to a rear window glass of a vehicle, wherein the rear window glass includes a side edge portion to which the bracket is to be attached, the bracket includes a base to be bonded to a surface of the side edge portion, the surface facing at least either an outer side or an inner side of the vehicle, the side edge portion and the base are joined to each other with use of a combination of at least two types of adhesives including a first adhesive and a second adhesive, the first adhesive having a shorter curing time than the second adhesive, the second adhesive providing stronger joining after cured than the first adhesive, and in the joining, the bracket is stabilized from an outside in a state in which the side edge portion and the base are in contact with each other with the first adhesive and the second adhesive interposed therebetween, and the stabilization of the bracket from the outside is released upon the first adhesive being cured, and curing of the second adhesive is allowed to proceed while the bracket continues to be stabilized with the first adhesive.

2. The method according to claim 1, wherein the bracket further includes a securing portion for securing a side spoiler, when the bracket is stabilized from the outside, the bracket is positioned such that the securing portion has a predetermined orientation with the rear window glass serving as a reference, and at this point, an inclination is permitted to arise between the side edge portion and the base, and the first adhesive and the second adhesive are cured while a gap between the side edge portion and the base is filled with the second adhesive and the first adhesive.

3. The method according to claim 2, wherein the bracket includes a portion that extends in a lengthwise direction along the side edge portion, a first bonding area on the base to which the first adhesive is to be applied is provided at at least two positions along the lengthwise direction of the bracket, and opposes at least two positions located in a top-and-bottom direction on the side edge portion, and the predetermined orientation of the securing portion is an orientation of the securing portion whose axis of rotation extends in the lengthwise direction.

4. The method according to claim 3, wherein the first bonding area is inclined with respect to the side edge portion so that a gap between the first bonding area and the side edge portion varies in size, and the variation in the size of the gap between the first bonding area and the side edge portion is compensated for by the first adhesive.

5. The method according to claim 1, wherein the bracket further incudes a securing portion for securing the side spoiler, and the bracket is secured in a state in which the base is in contact with the inner surface of the rear window glass in the side edge portion and in which the securing portion lies outside a side edge of the rear window glass.

6. The method according to claim 5, wherein the outer surface of the rear window glass in the side edge portion and a portion of the bracket that lies outside the side edge of the rear window glass are further linked with a reinforcer.

7. The method according to claim 6, wherein a combination of at least two types of adhesives including a third adhesive and a fourth adhesive is used to join the side edge portion and the reinforcer, the third adhesive has a shorter curing time than the fourth adhesive, and the fourth adhesive provides stronger joining after cured than the third adhesive, the third adhesive has a composition identical to or different from a composition of the first adhesive, and the fourth adhesive has a composition identical to or different from a composition of the second adhesive.

8. The method according to claim 1, wherein the first adhesive is a hot-melt adhesive, the second adhesive is an adhesive of at least one or more types selected from a moisture curing-type adhesive, a heat curing-type adhesive, a mixing reaction-type adhesive, a light curing-type adhesive, and an anaerobic curing-type adhesive, and when the combination of adhesives is placed between the side edge portion and the base, the second adhesive is applied first to either the side edge portion or the base, and then the first adhesive thermally molten in advance is applied to either the side edge portion or the base.

9. A bracket-attached glass in which a bracket for a side spoiler is joined to a rear window glass of a vehicle, wherein the rear window glass includes a side edge portion to which the bracket is to be attached, the bracket includes a base to be bonded to a surface of the side edge portion, the surface facing at least either an outer side or an inner side of the vehicle, the side edge portion and the base are joined to each other with use of a combination of at least two types of adhesives including a first adhesive and a second adhesive, the first adhesive has a shorter curing time than the second adhesive, and the second adhesive provides stronger joining after cured than the first adhesive, the rear window glass includes a joining portion where the rear window glass is joined with a window frame of the vehicle, and further includes the side edge portion to a side of the joining portion, the bracket further incudes a securing portion for securing the side spoiler, and the base is in contact with the inner surface of the rear window glass in the side edge portion, and the securing portion lies outside the side edge portion of the rear window glass.

10. The bracket-attached glass according to claim 9, wherein the bracket includes a portion that extends in a lengthwise direction along the side edge portion, and a first bonding area on the base to which the first adhesive is to be applied is provided at at least two positions along the lengthwise direction of the bracket, and opposes at least two positions located in a top-and-bottom direction on the side edge portion.

11. The bracket-attached glass according to claim 10, wherein the first bonding area is inclined with respect to the side edge portion so that a gap between the first bonding area and the side edge portion varies in size, and the variation in the size of the gap between the first bonding area and the side edge portion is compensated for by the first adhesive.

12. The bracket-attached glass according to claim 9, further comprising a reinforcer configured to link the outer surface of the rear window glass in the side edge portion with a portion of the bracket that lies outside the side edge portion of the rear window glass.

13. A tailgate provided with a side spoiler, the tailgate further comprising a window frame joined to the bracket-attached glass according to claim 9, wherein the side spoiler is joined to the bracket.

14. A vehicle provided with a side spoiler, the vehicle further comprising a window frame joined to the bracket-attached glass according to claim 9, wherein the side spoiler is joined to the bracket.

15. A bracket-attached glass in which a bracket for a side spoiler is joined to a rear window glass of a vehicle, wherein the rear window glass includes a side edge portion to which the bracket is to be attached, the bracket includes a base to be bonded to a surface of the side edge portion, the surface facing at least either an outer side or an inner side of the vehicle, the side edge portion and the base are joined to each other with use of a combination of at least two types of adhesives including a first adhesive and a second adhesive, the first adhesive has a shorter curing time than the second adhesive, and the second adhesive provides stronger joining after cured than the first adhesive, the base is inclined with respect to the side edge portion so that a gap between the base and the side edge portion varies in size, and the variation in the size of the gap between the base and the side edge portion is compensated for by the first adhesive.

16. The bracket-attached glass according to claim 15, wherein the bracket includes a portion that extends in a lengthwise direction along the side edge portion, a first bonding area on the base to which the first adhesive is to be applied is provided at at least two positions along the lengthwise direction of the bracket, and opposes at least two positions located in a top-and-bottom direction on the side edge portion.

\* \* \* \* \*